April 27, 1937.  C. H. BAER ET AL  2,078,828

SPRING MACHINERY

Filed Jan. 28, 1936  3 Sheets-Sheet 1

INVENTORS
CHARLES H. BAER
BY HERSCHEL M. CONNOR

ATTORNEY

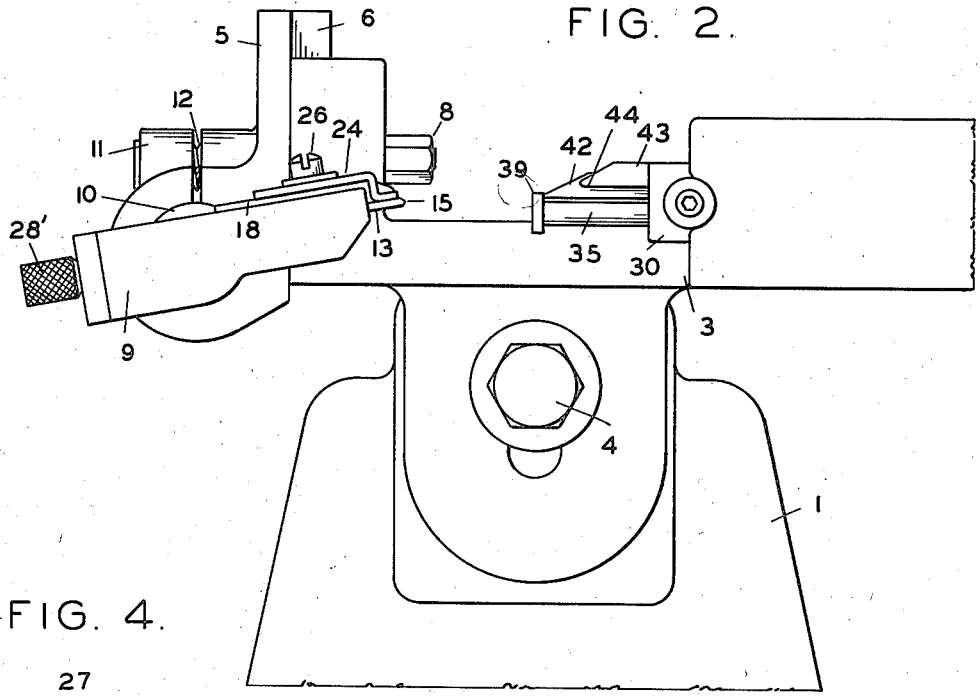
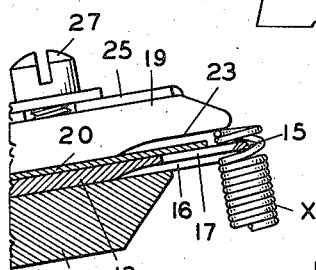
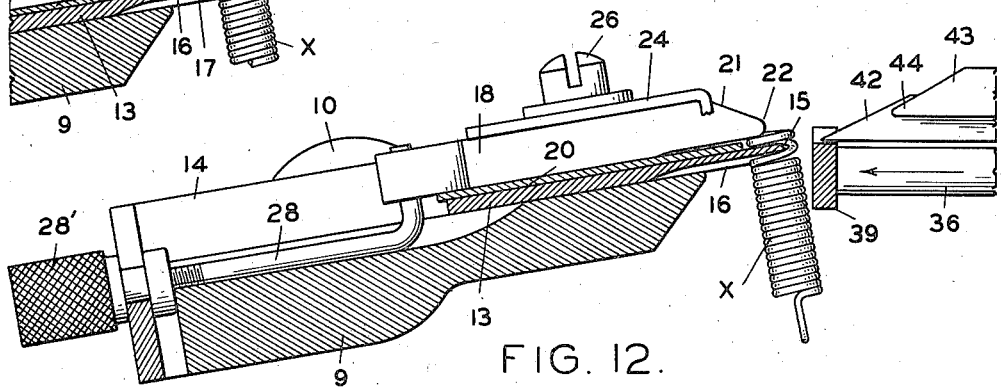
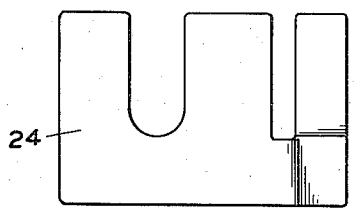

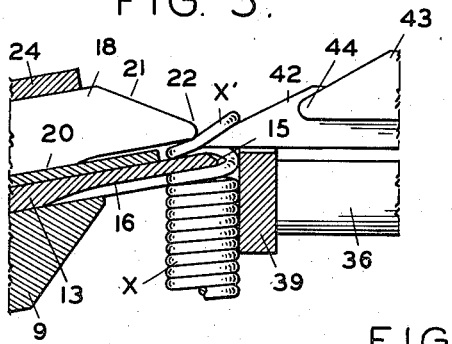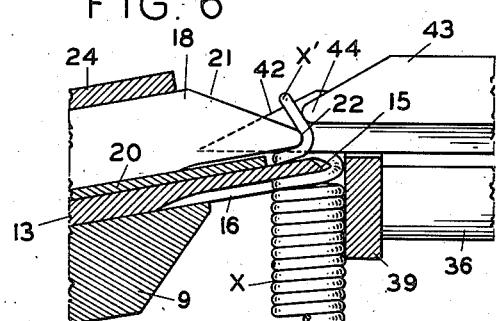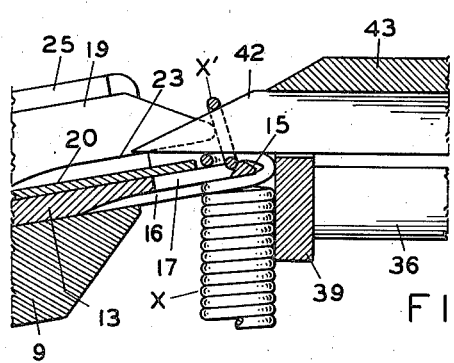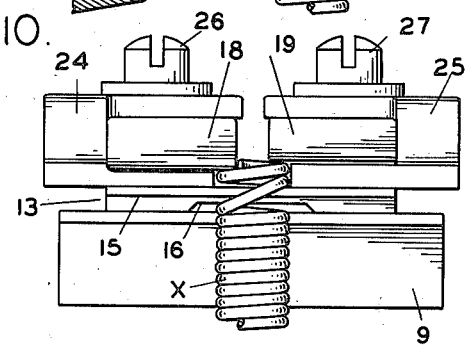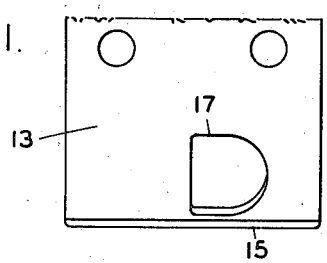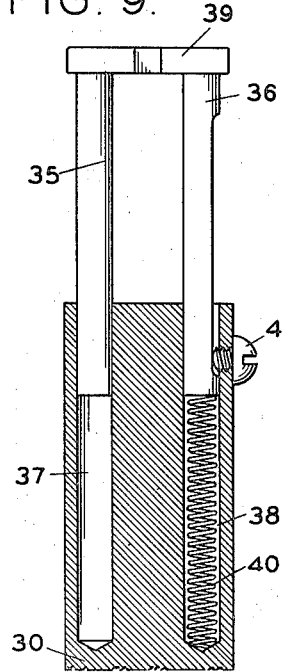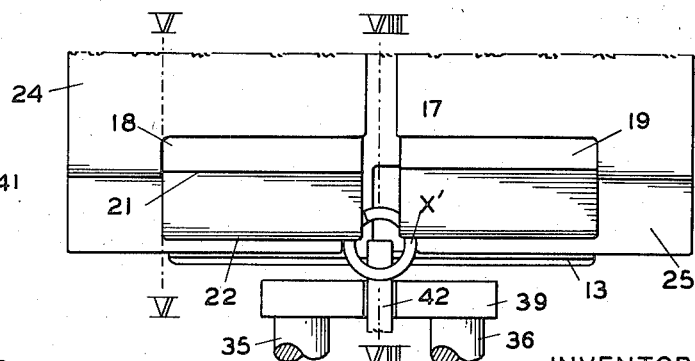

Patented Apr. 27, 1937

2,078,828

UNITED STATES PATENT OFFICE 2,078,828

SPRING MACHINERY

Charles H. Baer and Herschel M. Connor, San Francisco, Calif., assignors to Connor Spring Manufacturing Co., San Francisco, Calif., a copartnership composed of Charles H. Baer and Herschel M. Connor Application January 28, 1936, Serial No. 61,207

17 Claims. (Cl. 140—103)

This invention relates to spring machinery and more particularly to spring end looping machines.

Spring looping machines heretofore proposed are limited in operation to a single size of spring; although, by replacing the various holding and bending elements, they may be altered to loop springs of different sizes. Each set of these elements is comparatively expensive and as a result the expense involved in equipping a shop to turn out looped coil springs of different sizes is prohibitive.

Even when a shop is equipped with machines of the prior art having the several different sized holding and looping elements, there is no way of accurately forming the loop so that the loop may be made either smaller, larger, or exactly equal in size to the diameter of the body of the spring. In view of the fact that it is necessary in many cases, such as in the formation of springs used in adding machines or the like, to secure the springs to members which are either larger or smaller than the spring itself, there is an urgent demand for a machine which can properly and accurately form the desired size and shape loop.

Another difficulty experienced in spring looping machines heretofore proposed is their inability to provide a loop on a spring having a body formed by a low number of convolutions. In all of the machines of the prior art the gripping means for supporting the springs in position for looping must engage several coils of the spring body in order to hold the spring in any sort of accurate alignment with the looping elements, and if it is attempted to loop a short spring, the gripping means will either fail to firmly grip the spring or else will apply sufficient pressure to harmfully distort it.

It is accordingly, a primary object of the present invention to provide a spring looping machine which may accurately form loops on the ends of coil springs of varying diameters, lengths, and sizes, without resorting to the provision of several different sized spring looping and supporting members.

A further object of the invention resides in providing a spring looping machine which is capable of forming a loop on the end of a coil spring having a single coil serving as the spring body.

A still further object resides in providing a spring looping machine with means for supporting the spring by a set of gripping elements designed to clamp the spring at a point between loops of the body of the spring.

A further object of the invention is to form accurate loops on the ends of helical springs without altering the calibrated tension of the springs.

Another object is to provide a machine capable of end looping a wide range of springs varying in wire gauge, helical diameter and loop diameter and maintain a fixed precision standard in all springs of a given variety.

Another object is to loop the ends without applying distorting stresses to the body of the spring.

A further object is to maintain extreme accuracy and uniformity of tension in very small springs, such as demanded by calculating machines and the like.

In this specification and the accompanying drawings, the invention is disclosed in its preferred form. It is to be understood, however, that the invention may be embodied in other forms without departing from the spirit of the invention as defined in the claims following the description.

In the three sheets of drawings:

Fig. 2 is a side elevation of the same.

Fig. 3 is an enlarged fragmentary longitudinal vertical section, taken on the line III—III in Fig. 1 of the machine with a spring in position immediately before the looping operation.

Fig. 4 is a similar view taken on the line IV—IV, Fig. 1.

Fig. 5 is a further enlarged similar view of the same taken on the line V—V, in Fig. 8, certain parts being broken away to clarify the illustration, showing the beginning of the looping operation with the spring clamped and the terminal coil raised from the body of the spring.

Fig. 6 is a similar view of the same showing the final bending of the loop.

Fig. 7 is a similar view taken in the plane of Fig. 4 on the line VII—VII, Fig. 8, with the parts in the final position shown in Fig. 6.

Fig. 8 is a fragmentary plan view of the looping means with the parts in the positions shown in Fig. 5.

Fig. 9 is a horizontal section of the mounting of the yielding clamping bar.

Fig. 10 is a front end view of the spring rest with a spring in position thereon for the looping operation.

Fig. 11 is a detail view in plan of the blade upon which the spring is impaled for looping.

Fig. 12 is a detail view in plan of one of the gauge plates for locating the spring on the impaling blade.

Figures 1, 13:
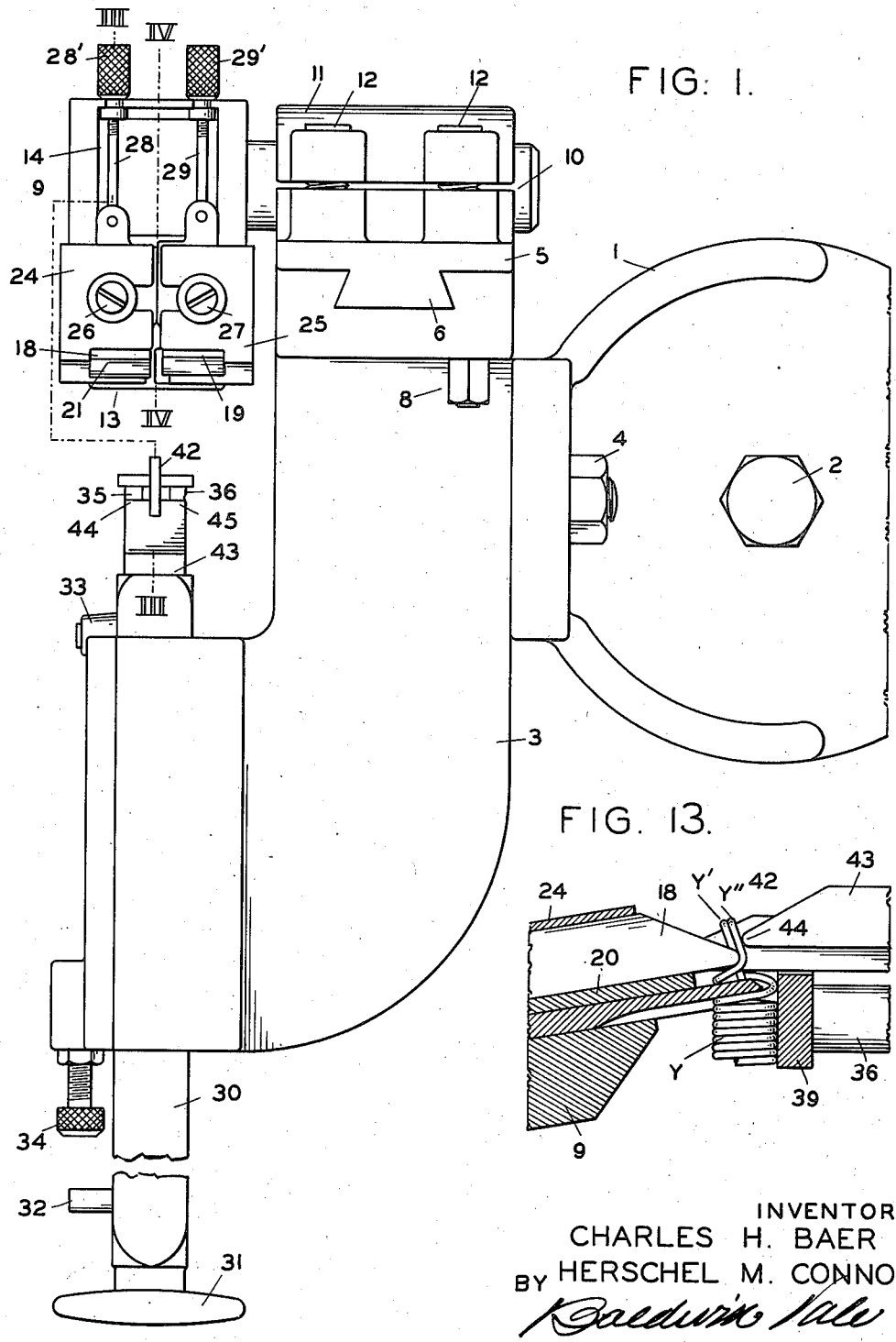
Fig. 1 is a plan view of a spring looping machine constructed in accordance with this invention.
Fig. 13 is a detail view in vertical section similar to Fig. 6 showing the bending of a double loop.

In detail the construction illustrated in the drawings referring more particularly to Figs. 1 and 2 comprises the pedestal 1 secured to a suitable work-bench by the bolt 2. The bracket 3 is adjustably mounted on the pedestal 1 by the bolt 4. The table 5 has the dovetail 6 engaging the bracket 3 and is vertically adjustable with respect to the bracket. It is retained in adjusted position by the bolt 8.

The rest 9 has the lateral trunnion 10 which extends into the split socket 11 on the table 5. The screws 12—12 are arranged to tighten the split socket to clamp the trunnion 10 therein. The rest 9 is adjusted to occupy an inclined position for reasons later described.

The blade 13 lies in the central channel 14, in the rest 9, see Figs. 2 and 9, and extends forwardly therefrom. The front end of the blade 25 has the knife edge 15 and is reduced in thickness at 16 to enable a spring to be impaled and supported thereon as in Fig. 3. The blade 13 has the opening 17 therethrough to provide clearance for the spring loop as later described.

The jaws or gauges 18 and 19 overlie the blade 13 and are spaced therefrom by the interposed shim 20. This shim should be of a thickness to correspond approximately to the gauge of the wire used in the springs. The jaw 18 is beveled at 21 and has its operative end 22 rounded off to cooperate with the spring wire. The similar jaw 19 is set in alinement with the jaw 18 or slightly to the rear thereof. The jaw 19 is undercut as at 23 to clear the double thickness of the terminal coil of the spring and its overlying free end (see Figs. 4 and 7).

The gauges 24, 25 overlie the jaws 18, 19 and are cut away to pass the ends of the jaws and are bent downward and outward so that their forward ends underlie the jaws. The opposed ends of the gauges 24 and 25 are spaced apart the diameter of the spring to be looped and are arranged to hold it against lateral movement during the looping operation. In the event that a loop of smaller or larger diameter is desired, gauges 24 and 25 are spaced apart a distance less than or greater than the diameter of the spring. The screws 26, 27 extend through slots in the gauges 24, 25, the jaws 18, 19, and the spacing shim 20 and are threaded into the rest 9 to secure the assembly together.

The jaws 18, 19 are adjustable relative to the knife edge 15 of the blade 13. The bent ends of the spindles 28, 29 engage lugs on the jaws 18, 19. The knurled adjusting nuts 28', 29' on the threaded spindles 28, 29 are swiveled in slots in the rest 9. Loosening the screws 26, 27 permits the position of the jaws 18, 19 to be adjusted by manipulation of the nuts 28', 29'.

The square plunger 30 is slidably mounted in the bracket 3 opposite the rest 9. It has the handle 31 for manual operation. The stops 32 and 33 limit the forward and backward movement of the plunger respectively. The extent of the forward movement of the plunger can be regulated by adjustment of the set screw 34 which is abutted by the stop 32.

The stems 35, 36 are slidable in the longitudinal openings 37, 38 in the plunger 30 and have the clamping bar 39 mounted at their forward ends. The stem 36 is urged outward by the expansion of the spring 40. The set screw 41 limits the forward movement of the stem 36 under the expansion of the spring 40.

The bayonet 42 is mounted in the head 43 on the end of the plunger 30 and tapers down to a point at its forward end. The head 43 terminates intermediate the length of the bayonet 42 and is rounded off to form the shoulders 44 and 45 lateral to the bayonet.

The invention operates substantially as follows: The close wound spring x is first manually impaled upon the blade 13 with the knife edge 15 entering between the first and second coils of the spring (see Figs. 3 and 10) or if a loop having more than one coil therein is desired, knife edge 15 is inserted as seen in Figure 13. This pries apart the adjacent coils and permits knife edge 15 to penetrate between the adjacent coils of the spring and engage the inner face of the portion of the wire connecting the two adjacent coils.

The ends 22 of the gauges or jaws 18 and 19 guide the spring into its predetermined position for looping. Prior to the impaling of spring x upon the blade 13, the gauges 24 and 25 are adjusted to the desired width of loop. It will, accordingly, be seen that the loop may be formed either equal to or smaller than the diameter of the spring body. Spring x is supported in a novel manner between the knife edge 15 and clamping bar 39, as hereinafter pointed out.

It will also be apparent that if it is desired, a spring having a body comprising a single coil may be provided with a loop by the above mentioned machine. In order to do so, the spring is impaled on blade 13 by inserting knife edge 15 between the body coil and terminal coil of the spring. When such a spring is inserted in the machine the gauges 18, 19, 24 and 25 operate in the same manner and are adjusted as hereinbefore described. Assuming that the desired spring has been impaled on blade 13 and gauges 18, 19, 24 and 25 have been properly adjusted, the machine is operated in the following manner.

The handle 31 is manually pushed forward carrying with it the plunger 30, clamping bar 39, bayonet 42, and head 43 having the shoulders 44 and 45 formed thereon. The clamping bar 39, which extends beyond the other elements carried by handle 31, engages the impaled spring x and firmly clamps it against the knife edge 15. From an inspection of the drawings, it will be clear that the spring x is clamped between knife edge 15 and bar 39 only, i. e., spring x is held in position for looping by means of the short section of the wire connecting the two adjacent coils between which the knife edge 15 enters. This clamping is, accordingly, accomplished without diametric pressure or other distorting forces being applied to the spring body. When the clamping bar 39 is engaged against the spring x the spring 40 yields permitting forward movement of the plunger 30 to continue.

The bayonet 42 enters between the coil x' and the body of the spring and forces them apart as graphically illustrated in Fig. 5. The inclined position of the rest 9 as previously described enables the bayonet to engage under one side of the coil x' and to pass above the opposite side of the coil with adequate clearance, see Fig. 7.

As the movement of the plunger 30 continues, the lateral shoulders 44 and 45 advance into engagement with the loop being formed from the coil $x'$. The side of the loop being confined beneath the jaw 18 then bends upward against the rounded portion 22 of jaw 18. The adjacent gauge 24 prevents lateral yielding of the loop under the bending strain. The opposite side of the loop is held parallel to the side being bent by the jaw 19. The opening 17 in the blade 13 receives the free end of the loop which recedes thereinto during the bending operation, see Fig. 7.

At the end of the movement of the plunger 30, the bent side of the loop is clamped between the blade 13, the jaw 18 and the shoulder 44. This bends the loop past its median position. The stop 32 engaging against the setscrew 34 arrests the advance of the plunger.

When the pressure of the shoulder 44 is released by the restoration of the plunger 30 to its original position, the loop straightens out slightly under its own resiliency and assumes a position in alinement with the longitudinal axis of the spring. The spring $x$ may then be manually removed from the blade 13 and its opposite end or another spring impaled thereon for a repeated looping operation.

After suitable adjustment of the spacing of the jaws 17, 18 from the blade 13, multiple loops may be formed on the spring (see Fig. 13). The bayonet 42 pries the last two coils $y'$, $y''$ apart from the body of the spring. The shoulder 44 then bends one side of the coil $y''$ against the cooperating jaw 18 to form a double loop as shown. The coil $y'$ moves off the underlying coil $y''$ leaving it exposed for this bending operation.

From the above description it will be readily seen that the looping machine of the present invention is capable of forming loops on the ends of springs having any desired number of coils. It will also be clear that the loops may be formed at any point within the diameter of the springs by properly adjusting jaws 18 and 19. The loops, furthermore, may be made of any desired size, irrespective of the size of the spring body by providing the spring, at the time it is wound, with a terminal coil, or coils of varying size and by adjusting the gauges 24 and 25 of the present apparatus so as to accurately engage the sides of the loop and properly limit its size.

The invention may be embodied in other specific forms without departing from the spirit or essential characteristics thereof. The present embodiment is therefore to be considered in all respects as illustrative and not restrictive, the scope of the invention being indicated by the appended claims rather than the foregoing description, and all changes which come within the meaning and range of equivalency of the claims are therefore intended to be embraced therein.

Having thus described this invention, what is claimed and desired to be secured by Letters Patent is:

1. A spring looping machine including a blade adapted to impale a spring and support it in position for looping; and loop bending means in cooperative relation to said blade.

2. A spring looping machine including a blade adapted to impale a spring and support it in position for looping; means for clamping the spring against said blade; and loop bending means adapted to cooperate with the said blade.

3. A spring looping machine including a blade adapted to impale a spring near its terminal coil; means for clamping the spring against said blade; a movable bayonet arranged to penetrate between said terminal coil and the remainder of the spring; and means cooperating with said bayonet for bending said terminal coil into a loop.

4. A spring looping machine including a blade adapted to impale a spring near its terminal coil; means for clamping the spring against said blade; fixed jaws adjacent the spring impaled on said blade; a movable bayonet arranged to penetrate between said terminal coil and the remainder of the spring; and shoulders on said bayonet arranged to bend said terminal coil into a loop against said jaws.

5. A spring looping machine including a blade adapted to impale a spring near its terminal coil; a pair of opposed interspaced gauges on said blade adapted to receive the spring therebetween; means for clamping the spring against said blade; jaws spaced from said blade and arranged to overlie the terminal coil of the impaled spring; and means adapted to bend said terminal coil into a loop against said jaws.

6. A spring looping machine including a blade adapted to impale a spring near its terminal coil; jaws on said blade adapted to overlie the terminal coil of the impaled spring; a plunger slidable with respect to said blade; a clamping bar yieldingly mounted in said plunger and adapted to engage against the impaled spring; a bayonet on said plunger arranged to penetrate between said terminal coil and the remainder of the spring; and shoulders on said bayonet arranged to bend said terminal coil into a loop against said shoulders.

7. A spring looping machine comprising a blade adapted to be inserted between a pair of adjacent coils of a spring and support it in position for looping, a clamping bar movable into engagement with the spring and operable to clamp said spring against a face of said blade, said clamping action being confined to the short length of said spring connecting said adjacent coils of said spring, a bayonet designed to penetrate between the terminal coil and the spring body, and means cooperating with said bayonet for bending said terminal coil.

8. The combination defined in claim 7 wherein said last mentioned means includes a pair of spaced gauging elements operable to limit the size of the loops.

9. A spring looping machine comprising means for supporting said spring in position to be looped, means for clamping said spring against bodily movement, means for engaging the terminal coil of the spring and bending it to form a loop, and a pair of spaced gauges for limiting the diameter of the loop in accordance with a predetermined setting of said gauges.

10. A spring looping machine comprising means for clamping and positioning a spring for looping, adjustable gauges operable to engage substantially diametrically opposite sides of a coil of said spring and predetermine the size of the loop, and means for looping said spring while it is held by said first-named means.

11. A spring looping machine comprising means for clamping and looping a coil spring, adjustable gauging elements for predetermining the size of the loop to be formed, and adjustable gauging elements for predetermining the position of said loop with respect to the axis of said spring, said adjustable gauging elements and said means being so related that they are operable to loop springs having end coils of a size different from that of the body coils.

12. A spring looping machine comprising means for clamping and looping a coil spring, adjustable gauging elements for predetermining the size of the loop to be formed, and adjustable gauging elements adapted to predetermine the position of said loop with respect to the axis of said spring, said adjustable gauging elements and said means being so related that they are operable to loop springs of varying size.

13. A spring looping machine comprising means to support a spring for looping, adjustable gauging elements for engaging a predetermined portion of the terminal coil of said spring whereby said loop may be formed at any desired point within the diameter of the spring body, means for bending said coil to form a loop, and adjustable gauging elements for receiving the loop and limiting the size thereof.

14. A spring looping machine for use in looping a coil spring comprising a blade adapted to be inserted between a terminal coil and a body coil of said spring, and a clamping bar for engaging said spring and gripping the portion of the spring connecting said coils between it and said blade, whereby the spring is firmly supported in position for looping without distortion of said body or said loop.

15. A spring looping machine for use in looping a coil spring comprising a blade adapted to be inserted between two adjacent coils of the spring and support the spring in position for looping, a clamping bar adapted to clamp the portion of the spring connecting said adjacent coils against said blade, and looping means adapted to act upon the coil on one side of said blade and form a loop, said clamping bar and said blade being so related that the stresses incident to the clamping and bending actions are confined to the portion of the spring clamped between said blade and said bar.

16. A spring looping machine adapted to provide springs of different size with loops comprising means for supporting said springs in position for looping, adjustable gauges adapted to be set for receiving springs of different sizes, adjustable gauges adapted to be set for forming a loop of predetermined size, and means cooperating with said last-mentioned adjustable gauges for acting upon certain of the coils of said springs to form a loop.

17. A spring looping machine comprising a blade for insertion between adjacent coils of said spring to support the spring in position for looping, a pair of spaced parallel gauges disposed above said blade and providing a space between said gauges and said blade for receiving one of said coils, said gauges being operable to predetermine the point, within the diameter of the spring body, at which the loop is to be formed, a clamping bar movable toward said gauges and said blade for clamping said spring against a face of said blade, a bayonet movable with said clamping bar and disposed above and slightly behind said clamping bar for insertion beneath said coil after the spring is clamped by said bar, whereby said coil is pulled out of the plane of the remaining coils and bent around the ends of said gauges to form said loop, and a head movable with said bar and said bayonet and having spaced shoulders formed thereon for engaging the under side of said loop and operable to further bend the loop around the ends of said first mentioned gauges and beyond said ends whereby the loop, when it springs back after said movable elements have been retracted, will lie in a plane parallel to the axis of said spring at the point predetermined by said gauges.

CHARLES H. BAER.
HERSCHEL M. CONNOR.